US009817478B2

(12) United States Patent
Nakamura et al.

(10) Patent No.: US 9,817,478 B2
(45) Date of Patent: Nov. 14, 2017

(54) VIBRATION DEVICE AND ELECTRONIC DEVICE

(71) Applicant: KYOCERA Corporation, Kyoto-shi, Kyoto (JP)

(72) Inventors: Shinya Nakamura, Moriyama (JP); Kenji Kouno, Yokohama (JP); Jun Takeda, Yokohama (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 86 days.

(21) Appl. No.: 14/429,020

(22) PCT Filed: Sep. 24, 2013

(86) PCT No.: PCT/JP2013/075678
§ 371 (c)(1),
(2) Date: Mar. 18, 2015

(87) PCT Pub. No.: WO2014/046279
PCT Pub. Date: Mar. 27, 2014

(65) Prior Publication Data
US 2015/0212579 A1    Jul. 30, 2015

(30) Foreign Application Priority Data
Sep. 24, 2012  (JP) .................. 2012-209781

(51) Int. Cl.
*G06F 3/041* (2006.01)
*G06F 3/01* (2006.01)
(Continued)

(52) U.S. Cl.
CPC ............ *G06F 3/016* (2013.01); *G06F 1/1626* (2013.01); *G06F 1/1643* (2013.01);
(Continued)

(58) Field of Classification Search
CPC ......... G06F 1/1656; G06F 3/016; G06F 3/041
See application file for complete search history.

(56) References Cited

U.S. PATENT DOCUMENTS

2003/0067449 A1    4/2003  Yoshikawa et al.
2005/0180082 A1*   8/2005  Nakamura ............. H01H 13/85
                                                           361/139
(Continued)

FOREIGN PATENT DOCUMENTS

JP    2003-122507 A    4/2003
JP    2005-228161 A    8/2005
(Continued)

OTHER PUBLICATIONS

International Search Report, PCT/JP2013/075678, dated Jan. 7, 2014, 2 pgs.
(Continued)

*Primary Examiner* — Insa Sadio
(74) *Attorney, Agent, or Firm* — Volpe and Koenig, P.C.

(57) ABSTRACT

A vibration device includes a touch panel, a vibrator that is arranged on the touch panel, a frame that is separated from at least a part of the touch panel and is arranged to surround the touch panel in a planar view, and a first connecting member that is arranged on the touch panel and the frame to cover a space between a part of the touch panel and the frame in a planar view and that connects the touch panel and the frame. Furthermore the first connecting member includes a first member positioned on the operation panel, a second member positioned on the frame, and a third member covering a space in a planar view. The thickness of the third member is smaller than those of the first and second members.

11 Claims, 10 Drawing Sheets

(51) Int. Cl.
*G06F 1/16* (2006.01)
*G06F 3/044* (2006.01)

(52) U.S. Cl.
CPC .......... *G06F 1/1656* (2013.01); *G06F 1/1684* (2013.01); *G06F 3/044* (2013.01); *G06F 3/0414* (2013.01); *G06F 2203/04105* (2013.01)

(56) References Cited

U.S. PATENT DOCUMENTS

2007/0080951 A1* 4/2007 Maruyama ............ G06F 1/1626
 345/173
2013/0328820 A1 12/2013 Kondoh et al.

FOREIGN PATENT DOCUMENTS

| | | |
|---|---|---|
| JP | 2009-026290 A | 2/2009 |
| JP | 2011-154431 A | 8/2011 |
| WO | 2012/114750 A1 | 8/2012 |

OTHER PUBLICATIONS

Japanese Office Action with English concise explanation, Japanese Patent Application No. 2014-536954, dated Mar. 15, 2016, 3 pgs.
Japanese Office Action with concise English explanation, Japanese Patent Application No. 2014-536954, dated Jun. 21, 2016, 3 pgs.

* cited by examiner

VIBRATION DEVICE AND ELECTRONIC DEVICE

FIELD

The present invention relates to a vibration device, and an electronic device.

BACKGROUND

In recent years, a tactile transmission technology in which various kinds of tactile senses such as pressing feeling, tracing feeling, and texture feeling are transmitted to a user that has made an operation, when a user operates an operation panel such as a touch panel (for example, refer to Patent Literature 1). A vibration device to which the tactile transmission technology is applied includes an operation panel such as a touch panel and a vibrator that vibrates the operation panel. By vibrating the operation panel by the vibrator, it is possible to transmit a tactile sense to a user that operates the operation panel. Because such a vibration device is equipped, for example, in a mobile terminal such as a smartphone and a mobile phone, certain dustproofness and waterproofness are required.

CITATION LIST

Patent Literature

Patent Literature 1: Japanese Patent Application Laid-open No. 2003-122507

SUMMARY

Technical Problem

However, for conventional vibration devices, there has been the possibility that vibration of the operation panel is inhibited if dustproofness and waterproofness are intended to be secured.

Solution to Problem

A vibration device according to an aspect of an embodiment includes an operation panel; a vibrator that is arranged on the operation panel; a frame that is separated from at least a part of the operation panel and is arranged to surround the operation panel in a planar view; and a first connecting member that is arranged on the operation panel and the frame to cover a space between the part of the operation panel and the frame in a planar view and that connects the operation panel and the frame. Furthermore, the first connecting member includes a first member positioned on the operation panel, a second member positioned on the frame, and a third member covering the space in a planar view. The thickness of the third member is smaller than those of the first and second members.

An electronic device according to an aspect of the embodiment includes the vibration device.

DESCRIPTION OF EMBODIMENT

An embodiment of the present invention is explained below with reference to the accompanying drawings.

Note that respective drawings referred to below indicate essential components necessary for explaining the present invention in a simplified manner out of components of one embodiment of the present invention, for convenience of explanation. Therefore, a vibration device and an electronic device according to the present invention can have any component that is not illustrated in each drawing to which the present application refers.

Figure 1:
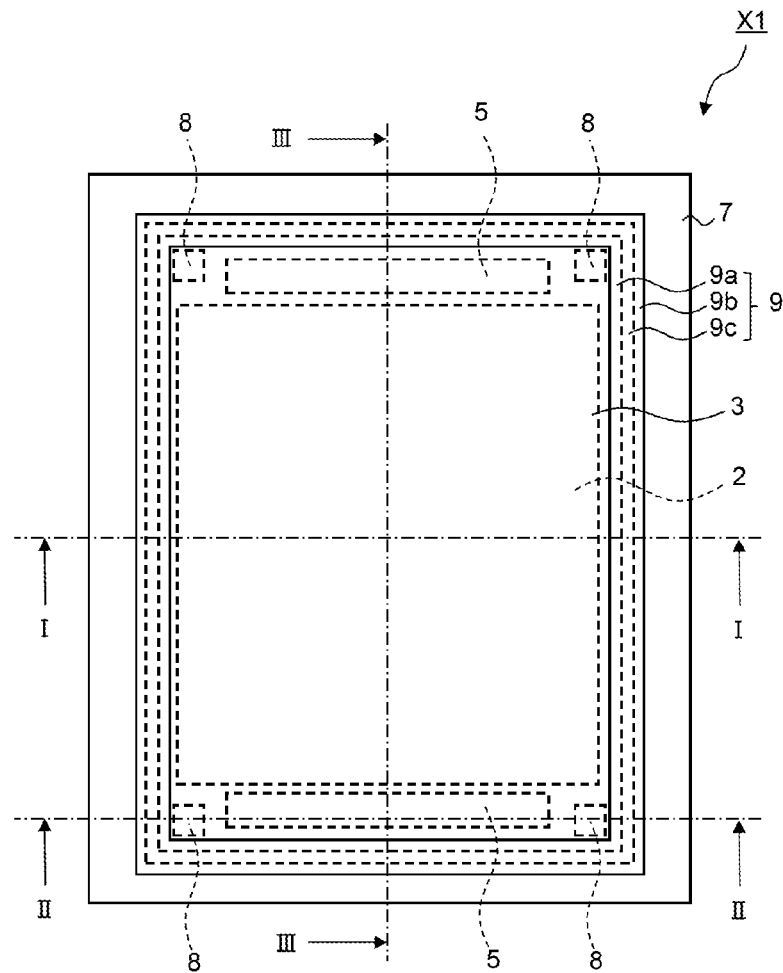
FIG. 1 is a plan view indicating a schematic configuration of a vibration device according to a present embodiment.

As indicated in FIG. 1 to FIG. 4, a vibration device X1 according to a present embodiment includes a liquid crystal panel 2, a touch panel 3, a protecting member 4, a vibrator 5, a substrate 6, a frame 7, a supporting member 8, and a first connecting member 9. In FIG. 1, illustration of the protecting member 4 is omitted for the sake of simplification. The same applies to FIG. 12 and FIG. 14 referred to later.

The liquid crystal panel 2 includes one board, another board that is arranged opposing to the one board, a liquid crystal layer that is present between the one board and the other board, a display member layer that is present between the one board and the other board and that contributes to display, and a backlight that irradiates light to the one board and the other board. For convenience of explanation, illustration of the one board, the other board, the liquid crystal layer, the display member layer, and the backlight is omitted. As the display member layer, for example, pixel electrodes, an orientation film, a color filter, and the like are considered.

A driving method of the liquid crystal panel 2 may be a simple matrix driving, or an active matrix driving.

Instead of the liquid crystal panel 2, a plasma panel, an organic EL display, an electronic paper, or the like may be used. When the organic EL display is used in place of the liquid crystal panel 2, the backlight is not necessary.

Figure 2:
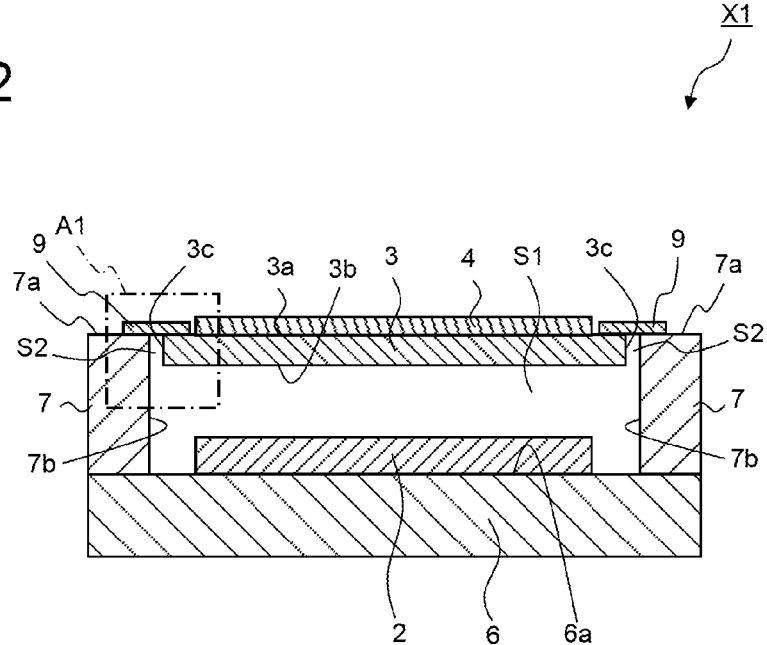
FIG. 2 is a cross section taken along a section line I-I indicated in FIG. 1.
Figure 3:
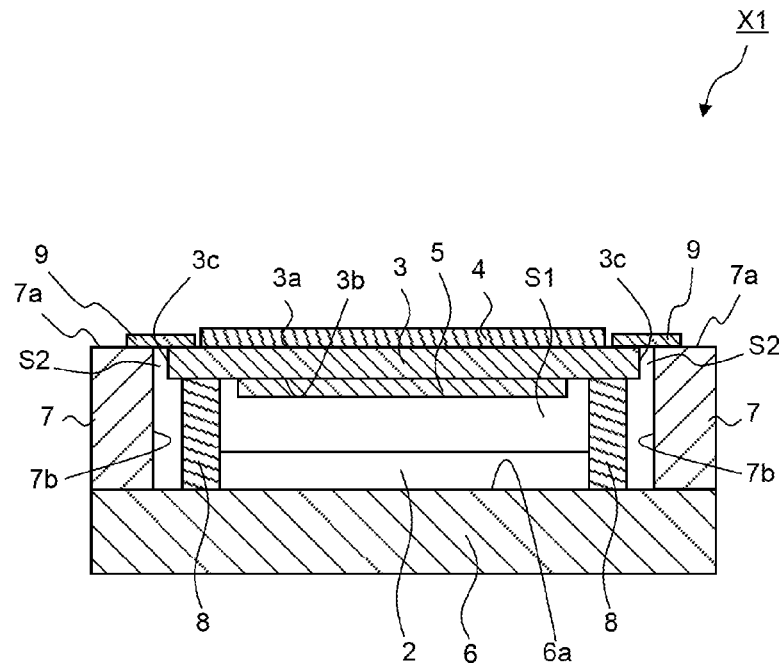
FIG. 3 is a cross section taken along a section line II-II indicated in FIG. 1.
Figure 4:
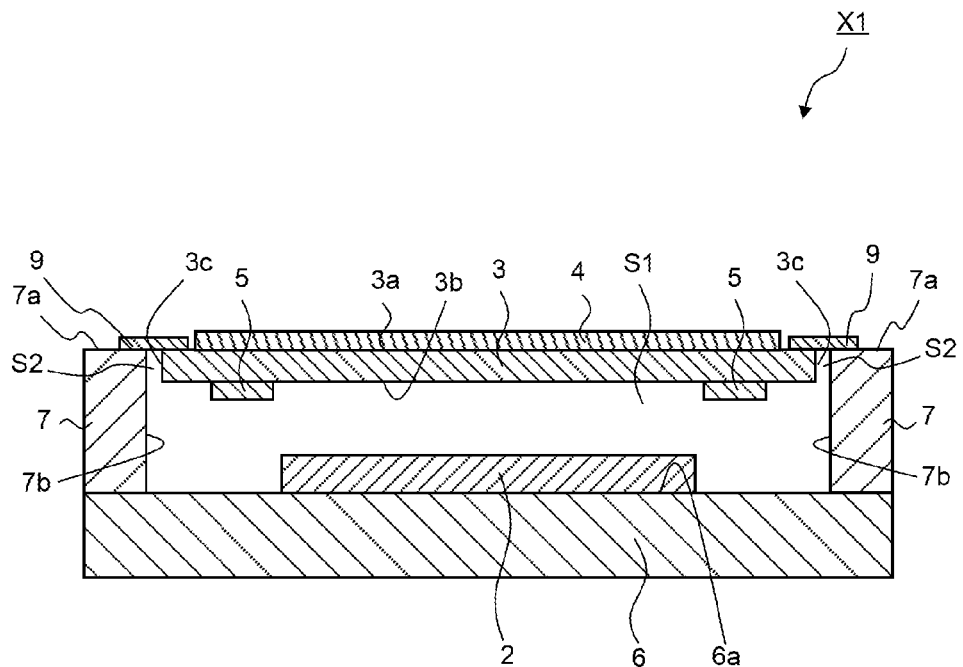
FIG. 4 is a cross section taken along a section line III-III indicated in FIG. 1.

The touch panel (operation panel) 3 is an input device that detects a point at which a user operates with a finger, a pen, or the like, as an input position. The touch panel 3 includes a top surface 3a, a bottom surface 3b that is positioned at an opposite side to the top surface 3a, and four end surfaces 3c that are adjacent to the top surface 3a and the bottom surface 3b. The top surface 3a of the touch panel 3 is the surface operated with a finger, a pen, or the like by a user through the protecting member 4. Moreover, as indicated in FIG. 2 to FIG. 4, the touch panel 3 is arranged opposing to the liquid crystal panel 2 through a first space S1. The first space S1 is a space formed by the touch panel 3, the substrate 6, the frame 7, and the first connecting member 9. Although, the touch panel 3 has a rectangular shape in a planar view as indicated in FIG. 1, it is not limited thereto, and the shape thereof is arbitrary.

In the present embodiment, the touch panel 3 is a touch panel of an electrostatic capacity type in terms of improving detection sensitivity. Furthermore, it is preferable to be a cover-glass integrated type among touch panels of an electrostatic capacity type, in terms of reducing the thickness. As the touch panel 3, instead of a touch panel of an electrostatic capacity type, for example, a touch panel of a resistance film type, a touch panel of a surface acoustic wave type, a touch panel of an infrared ray type, or a touch panel of an electromagnetic induction type may be used.

Moreover, although the liquid crystal panel 2 and the touch panel 3 are separate components in the present embodiment, it is not limited thereto. The liquid crystal panel 2 and the touch panel 3 may be attached to each other. Furthermore, a display panel having an input function may be adopted as the touch panel 3. As a display panel having an input function, for example, an in-cell touch panel, or on-cell touch panel can be considered. The protecting member 4 has a role of protecting the top surface 3a of the touch panel 3 so as not to be damaged by contact of a finger of a user. Therefore, the protecting member 4 is arranged over the top surface 3a of the touch panel 3 through an adhering means not shown. Specifically, the protecting member 4 is arranged in a region except for a region in which the first connecting member 9 is arranged on the top surface 3a of the touch panel 3. As a constituent material of the protecting member 4, for example, glass or plastic can be considered.

The protecting member 4 is preferable to have a shatter-proof function. If the protecting member 4 has a shatterproof function, for example, when the vibration device X1 is dropped, it is possible to reduce a possibility that the touch panel 3 is damaged. Moreover, even if the touch panel 3 is damaged, it is possible to reduce a possibility that glass scatters around. When the protecting member 4 has a shatterproof function, the protecting member 4 is formed, for example, by arranging high hard-coat layer and an adhesive layer on a polyethylene terephthalate film.

If it is not necessary to protect the top surface 3a of the touch panel 3 from a damage by touch of a finger of a user, the protecting member 4 is not required to be arranged on the top surface 3a of the touch panel 3.

The vibrator 5 has a role of causing the touch panel 3 to make bending vibration when a predetermined input operation made by a user is detected. Specifically, the vibrator 5 repeats expansion and contraction movement in a direction of a short side of the touch panel 3, thereby causing the touch panel 3 to make bending vibration in a direction of thickness of the touch panel 3 (hereinafter, the direction is referred to as "vertical direction"). Although details are referred to later, the vibrator 5 also has a role of detecting a pressing load to the touch panel 3.

The vibrator 5 is arranged on the bottom surface 3b of the touch panel 3. In the present embodiment, each one of two units of the vibrators 5 are arranged near both of short sides of the touch panel 3 along the respective short sides as indicated in FIG. 1. The position, the number, and the like of the vibrators 5 are not particularly limited. For example, each one of two units of the vibrators 5 may be arranged near both of long sides of the touch panel 3 along the respective long sides. Moreover, for example, each one of four units of the vibrators 5 may be arranged near both of the long sides and both of the short sides of the touch panel 3 along the respective long sides and the respective short sides.

Although the vibrator is a piezoelectric element that makes expansion and contraction movement based on an applied voltage in the present embodiment, it is not limited thereto. As the vibrator 5, an electromagnetic vibrator, a motor, or the like may be used instead of a piezoelectric element. Furthermore, the piezoelectric element may be one of monomorph, unimorph, and bimorph.

Moreover, the vibrator 5 is not required to be arranged directly on the bottom surface 3b of the touch panel 3. That is, the vibrator 5 may be housed in, for example, a metal casing, and may be arranged on the bottom surface 3b of the touch panel 3 through the metal casing.

The substrate 6 and the frame 7 have a role of containing the liquid crystal panel 2. The substrate 6 includes a main surface 6a. On the main surface 6a of the substrate 6, the liquid crystal panel 2 is arranged. The frame 7 is arranged on the main surface 6a of the substrate 6 so as to surround the liquid crystal panel 2 and the touch panel 3. The frame 7 is separated from all of the end surfaces 3c of the touch panel 3. The frame 7 includes a top surface 7a and a side surface 7b. In the present application, out of the first space S1, a space between the end surface 3c of the touch panel 3 and the frame 7 is referred to as a second space S2. As a constituent material of the substrate 6 and the frame 7, for example, resin such as polycarbonate and a metal such as stainless steel, aluminum, and a magnesium alloy can be considered. The substrate 6 and the frame 7 may be formed in one piece, or be formed separately.

Although an example in which the frame 7 is separated from all of the end surfaces 3c of the touch panel 3 has been explained, it is not limited thereto. The frame 7 is only required to be separated from at least a part of the touch panel 3. That is, the frame 7 may have a part that is in contact with the end surface 3c of the touch panel 3.

The supporting member 8 has a role of supporting the touch panel 3 in a vibratable manner. In the present embodiment, the supporting member 8 supports the bottom surface 3b of the touch panel 3. The supporting member 8 is positioned between the bottom surface 3b of the touch panel 3 and the main surface 6a of the substrate 6. Specifically, the supporting member 8 is connected to the bottom surface 3b of the touch panel 3 and the main surface 6a of the substrate 6 through an adhering means not shown. Furthermore, in the present embodiment, more than one supporting member 8 is arranged such that the supporting members 8 are separated from each other in a planar view. Specifically, the supporting members 8 are positioned at four corners of the touch panel 3. The shape of the supporting member 8 is, for example, a cylindrical shape; however, it may be a prismatic shape. The supporting member 8 has elasticity so as not to inhibit vibration of the touch panel 3. Therefore, as a constituent material of the supporting member 8, for example, silicone rubber, urethane rubber, foamed urethane, and other kinds of rubbers can be considered.

Although an example in which the supporting members 8 are positioned at the four corners of the touch panel 3 has been explained, it is not limited thereto. The supporting member 8 may be positioned along the long side between the corners of the touch panel 3 in addition to the four corners of the touch panel 3.

Moreover, although an example in which the supporting member 8 is arranged on the main surface 6a of the substrate 6 has been explained above, it is not limited thereto. For example, the supporting member 8 may be arranged on the liquid crystal panel 2, and the supporting member 8 arranged on the liquid crystal panel 2 may support the touch panel 3. Furthermore, the supporting member 8 may be formed in one piece with, for example, the substrate 6 or the frame 7.

The first connecting member 9 has a role of connecting the touch panel 3 and the frame 7. The first connecting member 9 is arranged on the top surface 3a of the touch panel 3 and the top surface 7a of the frame 7 so as to overlap with the second space S2 in a planar view. In the present embodiment, the first connecting member 9 is arranged so as to cover the second space S2. Because the first connecting member 9 is arranged so as to cover the second space S2, it is possible to reduce a possibility in which dust or water enters in the first space S1. Therefore, the vibration device X1 has certain dustproofness and waterproofness.

To "have certain dustproofness and waterproofness" herein does not require to have complete dustproofness and waterproofness. If entry of dust or water into the first space S1 is avoided even temporarily, it is regarded to "have certain dustproofness and waterproofness" indicated in the present application.

Figure 5:
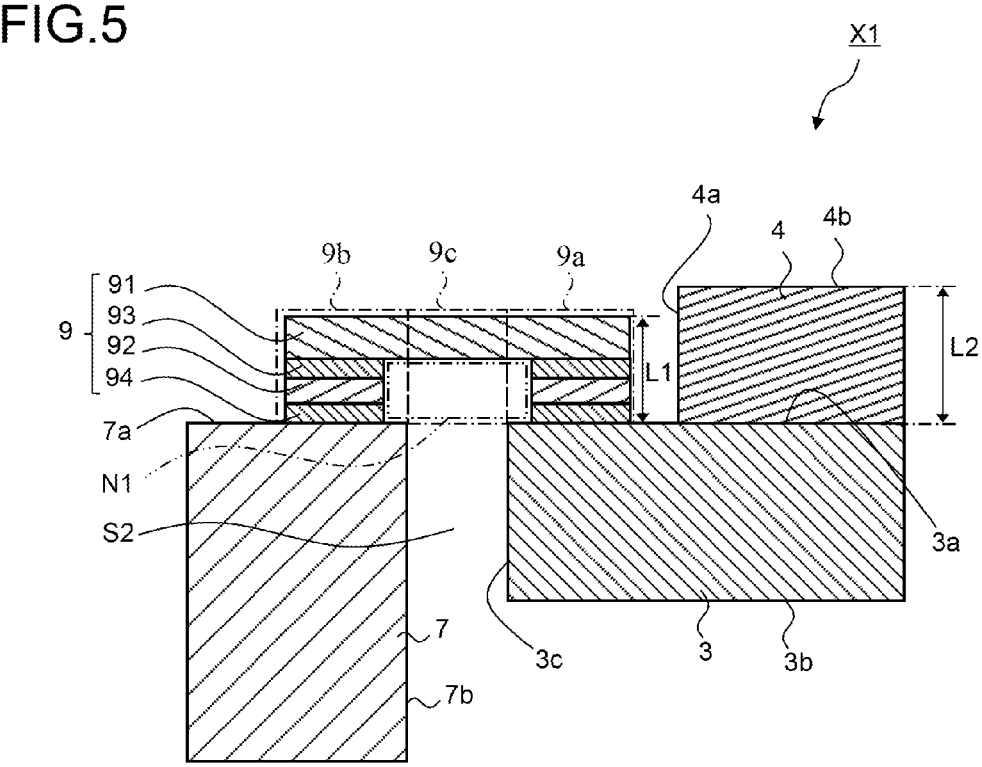
FIG. 5 is an enlarged view of a portion A1 indicated in FIG. 2.

FIG. 5 is an enlarged view of a portion A1 indicated in FIG. 2. As indicated in FIG. 5, the first connecting member 9 includes a first base 91 (base), an intermediate base member 92, a first adhesive 93, and a second adhesive 94. The first connecting member 9 is arranged so as to be separated from an end surface 4a of the protecting member 4.

The first base 91 has a role of supporting the intermediate base member 92, the first adhesive 93, and the second adhesive 94. In the present embodiment, the first base 91 has elasticity. Therefore, the first base 91 is formed with, for example, an elastic material of a rubber family or a foam resin family. As an elastic material of a rubber family, for example, a polybutadiene family, a nitrile family, a chloroprene family, and a cis-polyisoprene family can be considered. As an elastic material of a foam resin family, for example, polyurethane, polystyrene, polyolefin, and polypropylene can be considered. Moreover, in the present embodiment, the thickness of the first base 91 is set to 0.03 mm to 0.1 mm.

The intermediate base member 92 has a role of supporting the first adhesive 93 and the second adhesive 94. As a constituent material of the intermediate base member 92, ones similar to the first base 91 can be considered.

The first adhesive 93 has a role of connecting the first base 91 and the intermediate base member 92. The second adhesive 94 has a role of connecting the intermediate base member 92 and the top surface 3a of the touch panel 3, and a role of connecting the intermediate base member 92 and the top surface 7a of the frame 7. That is, one surface of the intermediate base member 92 is connected to the first base 91 through the first adhesive 93, and another surface is connected to the top surface 3a of the touch panel 3 and the top surface 7a of the frame 7 through the second adhesive 94.

As a constituent material of the first adhesive 93 and the second adhesive 94, for example, acrylic resin, urethane resin, epoxy resin, silicone resin, phenolic resin, and polyamide resin can be considered.

Because the intermediate base member 92 is included in the first connecting member 9, it becomes easy to affix the first connecting member 9 to the top surface 3a of the touch panel 3 and the top surface 7a of the frame 7. That is, workability in manufacturing the vibration device X1 is improved. The intermediate base member 92 is not required to be included in the first connecting member 9. In this case, the first adhesive 93 and the second adhesive 94 function as one adhesive.

The connecting member 9 includes a first member 9a, a second member 9b, and a third member 9c. The first member 9a is a member that is position on the touch panel 3. As indicated in FIG. 5, in the present embodiment, the first member 9a corresponds to the connecting member 9 that is positioned in a region surrounded by an alternate long and short dash line on the top surface 3a of the touch panel 3. Moreover, the second member 9b is a portion that is positioned on the frame 7. As indicated in FIG. 5, in the present embodiment, the second member 9b corresponds to a part of the connecting member 9 that is positioned in a region surrounded by an alternate long and short dash line on the top surface 7a of the frame 7. Furthermore, the third member 9c is a portion that is overlapped with the second space S2 in a planar view. As indicated in FIG. 5, in the present embodiment, the third member 9c corresponds to a part of the connecting member 9 that is positioned in a region surrounded by an alternate long and short dash line on the space S1.

The thickness of the third member 9c is smaller than the thickness of the first member 9a and the second member 9b. Therefore, it is possible to reduce a possibility that the first member 9a is restrained firmly by the third member 9c. Therefore, for example, it becomes easy for the first member 9a to follow vibration of the touch panel 3 when the touch panel 3 repeats bending vibration in the vertical direction. As described, in the vibration device X1, it is possible to reduce the possibility that vibration of the touch panel 3 is inhibited.

In the present application, the thickness of the third member 9c signifies the minimum thickness of the third member 9c. That is, even when the thickness of a part of the third member 9c is larger than the thickness of the first member 9a and the second member 9b, as long as the thickness of the rest of the third member 9c is smaller than the thickness of the first member 9a and the second member 9b, an effect of the present invention is obtained.

Moreover, it is preferable that an absent region N1 in which the intermediate base member 92, the first adhesive 93, and the second adhesive 94 are not arranged, be included on the first base 91 of the third member 9c as the present embodiment. Specifically, the absent region N1 is a region in which the intermediate base member 92, the first adhesive 93, and the second adhesive 94 are cut out on the first base 91 of the third member 9c. In the vibration device X1, because the first adhesive 93 and the second adhesive 94 are not present in the absent region N1, it is possible to reduce a possibility that the touch panel 3 is restrained firmly to the frame 7 by the second adhesive 94. Furthermore, because the first base 91 is not present in the absent region N1, it is possible to reduce the possibility that vibration of the touch panel 3 is transmitted to the frame 7 through the first base 91. Therefore, it is possible to further reduce the possibility that vibration of the touch panel 3 is inhibited.

Although all of the intermediate base member 92, the first adhesive 93, and the second adhesive 94 are not present on the first base 91 of the third member 9c in the present embodiment, it is not limited thereto, and a configuration in which a part of the intermediate base member 92, the first adhesive 93, or the second adhesive 94 is not present thereon is also possible.

Moreover, it is preferable that the absent region N1 be positioned in an area including a part of the first member 9a, the third member 9c, and a part of the second member 9b as the present embodiment. Specifically, the absent region N1 included on the third member 9c of the base 91 is preferable to be arranged extending over a part of the base 91 included in the first member 9a and a part of the base 91 included in the second member 9b. With such a configuration, it is possible to further reduce the possibility that vibration of the touch panel 3 is inhibited.

Furthermore, it is preferable that the third member 9c be positioned so as to surround the touch panel 3 in a planar view as the present embodiment. Specifically, the third member 9c covers the second space S2 that surrounds all around the touch panel 3 in a planar view. Therefore, it is possible to further reduce the possibility that dust or dirt enters inside the vibration device X1 through the second space S2. Moreover, it is preferable that the supporting members 8 be separated from each other in a planar view as the present embodiment. With such a configuration, the bottom surface 3b of the touch panel 3 can be supported at multiple supporting points. Therefore, even when the touch panel 3 is restrained firmly to the frame 7 by positioning the third member 9c so as to surround the touch panel 3 in a planar view, bending vibration of the touch panel 3 is facilitated with the multiple supporting points as starting points.

Furthermore, it is preferable that the first base 91 have elasticity as the present embodiment. When the first base 91 has elasticity, it becomes easy for the first base 91 to follow vibration of the touch panel 3. Moreover, with the same reason as this, it is preferable that the intermediate base member 92 have elasticity also.

Furthermore, it is preferable that the thickness of the first base 91 be set to 0.03 mm to 0.1 mm as the present embodiment. When the thickness of the first member 91 is set to 0.03 mm to 0.1 mm, it becomes easier for the first base 91 to follow vibration of the touch panel 3.

Moreover, the first connecting member 9 is not required to be formed by layering the first base 91, the second base material 92, the first adhesive 93, and the second adhesive 94, and for example, may be formed with a single-piece resin material. In such a case, if at least a part of the third member 9c is concave in the vertical direction, the thickness of the third member 9c becomes smaller than the thickness of the first member 9a and the thickness of the second member 9b.

It is preferable that a thickness L1 of the first member 9a be substantially the same or smaller than a thickness L2 of the protecting member 4. In the present embodiment, it is configured such that the thickness L1 of the first member 9a is smaller than the thickness L2 of the protecting member 4. With such a configuration, it is possible to reduce a possibility that a user that is touching the protecting member 4 to operate the touch panel 3 accidentally touches the first member 9a. Because the possibility that a user accidentally touches the first member 9a can be reduced, it is possible to reduce a possibility that the first connecting member 9 comes off from the top surface 3a of the touch panel 3 and the top surface 7a of the frame 7. Moreover, when it is configured such that the thickness L1 of the first member 9a is substantially the same or smaller than the thickness L2 of the protecting member 4, the first connecting member 9 becomes inconspicuous to a user, and the designability of the vibration device X1 improves.

Figure 6:
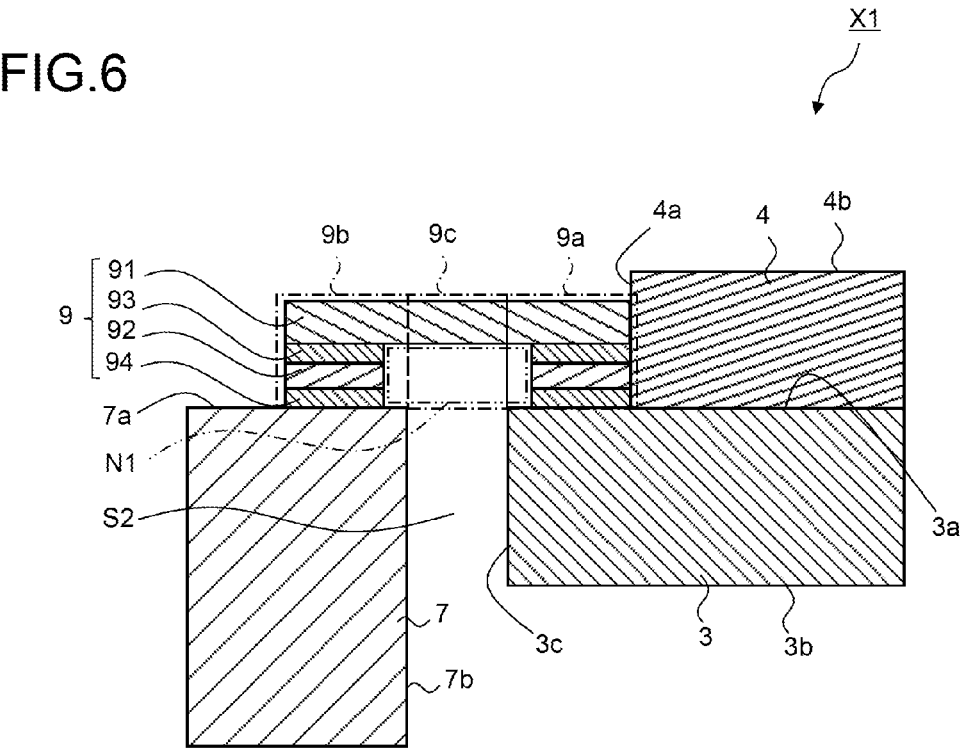
FIG. 6 is a cross section indicating another example of the above vibration device, and indicates a part identical to that of FIG. 5.

Furthermore, when the first member 9a is arranged so as to be separated from the end surface 4a of the protecting member 4 as indicated in FIG. 5, there is a possibility that light from the backlight comes out from a gap present between the first member 9a and the end surface 4a of the protecting member 4. If light comes out from the gap, the light is visually recognized by a user, there is a possibility that the viewability of the vibration device X1 is deteriorated. Accordingly, as indicated in FIG. 6, the first member 9a is preferable to be in contact with the end surface 4a of the protecting member 4. If the first member 9a is in contact with the end surface 4a of the protecting member 4, the possibility that a gap is created between the first member 9a and the end surface 4a of the protecting member 4 can be reduced. Therefore, in the configuration indicated in FIG. 6, the viewability of the vibration device X1 can be improved compared to the configuration indicated in FIG. 5.

Figure 7:
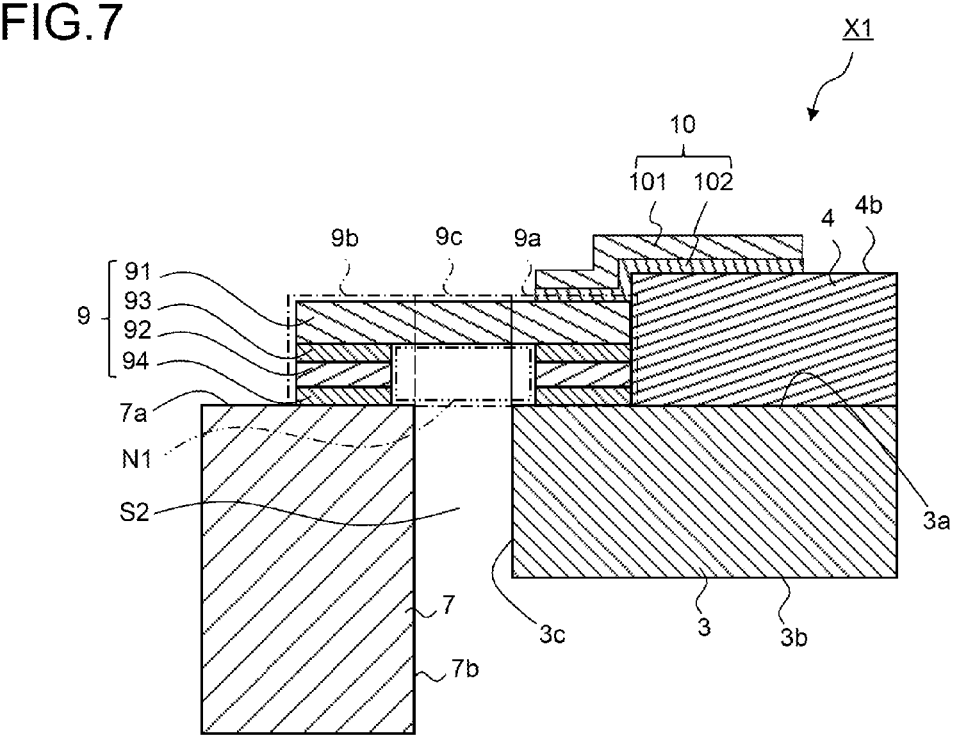
FIG. 7 is a cross section indicating still another example of the above vibration device, and indicates a part identical to that of FIG. 5.

Moreover, as indicated in FIG. 7, it is preferable that the vibration device X1 further include a second connecting member 10 that is arranged on the top surface 3a of the touch panel 3 so as to cover a part of the first connecting member 9. In the example indicated in FIG. 7, the second connecting member 10 is arranged thereon from the first base 91 of the first member 9a to a top surface 4b of the protecting member 4. The second connecting member 10 includes a second base 101 and an adhesive 102. The second base 101 has a role of supporting the adhesive 102. As a constituent material of the second base 101, one similar to those of the first base 91 can be considered. The adhesive 102 has a role of connecting the second base 101 and the first base 91, and has a role of connecting the second base 101 and the top surface 4b of the protecting member 4 also. As a constituent material of the adhesive 102, ones similar to those of the first adhesive 93 and the second adhesive 94 can be considered. Because the second connecting member 10 is arranged on the top surface 3a of the touch panel 3 so as to cover a part of the first connecting member 9, it is possible to reduce the possibility that the first connecting member 9 comes off from the top surface 3a of the touch panel 3.

Although an example in which the second connecting member 10 is arranged on the top surface 3a of the touch panel 3 so as to cover a part of the first connecting member 9 has been explained above, it is not limited thereto. The second connecting member 10 may be arranged on the top surface 7a of the frame 7 so as to cover a part of the first connecting member 9. Moreover, the second connecting member 10 may be arranged on the top surface 3a of the touch panel 3 and the top surface 7a of the frame 7 so as to cover an entire surface of the first connecting member 9.

Furthermore, although an example in which the second connecting member 10 includes the second base 101 and the adhesive 102 has been explained above, it is not limited thereto. For example, the second connecting member 10 may be formed with a resin material.

Figure 8:
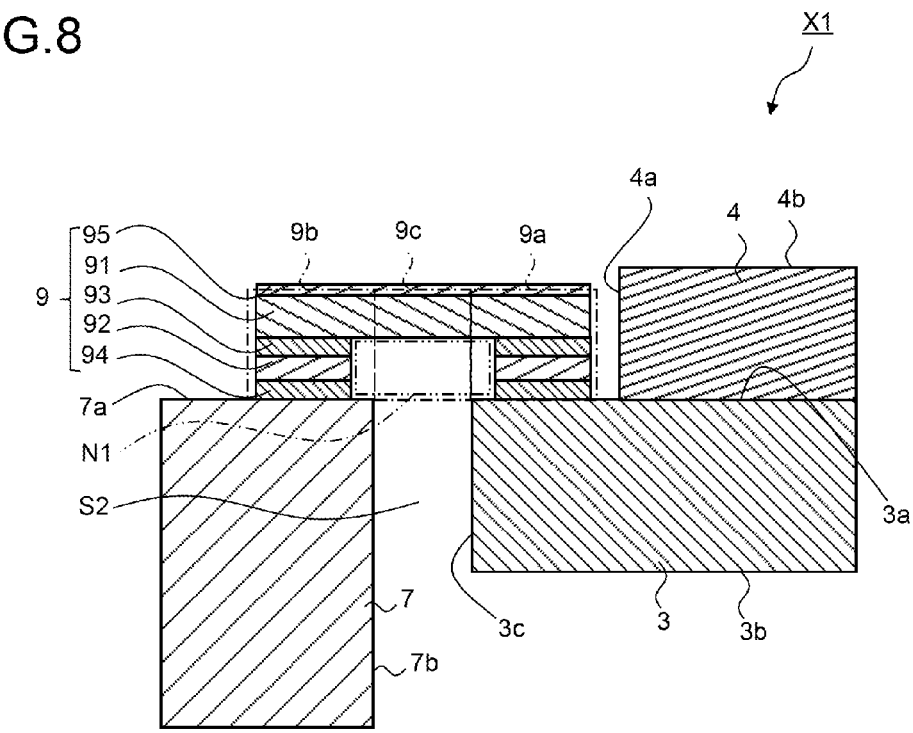
FIG. 8 is a cross section indicating still another example of the above vibration device, and indicates a part identical to that of FIG. 5.

Moreover, as indicated in FIG. 8, the first connecting member 9 is preferable to have a colored layer 95. Specifically, the colored layer 95 is arranged on the first base 91. With such a configuration, the designability of the vibration device X1 improves. Furthermore, because the colored layer 95 is arranged on the first base 91, it is possible to reduce a possibility that the inside of the vibration device X1 is seen by a user through the second space S2. The colored layer 95 may be unified with the first base 91. Specifically, the colored layer may be formed by coloring the first base 91.

Figure 9:
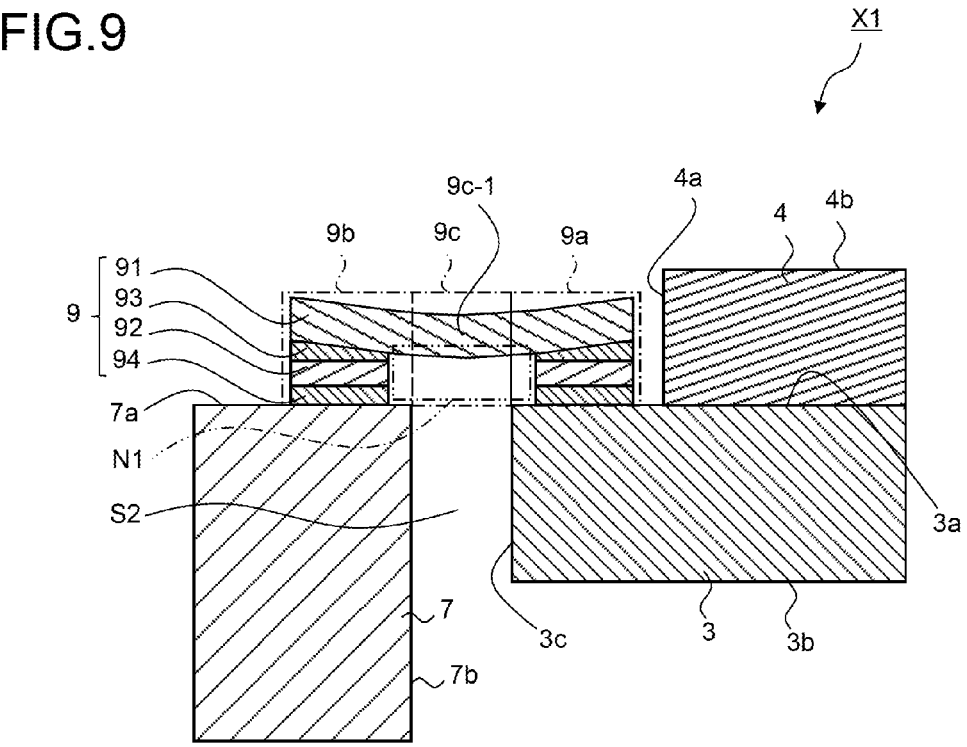
FIG. 9 a cross section indicating still another example of the above vibration device, and indicates a part identical to that of FIG. 5.

Furthermore, as indicated in FIG. 9, the third member 9c is preferable to have a flexible portion 9c1. Specifically, a part of the first base 91 included in the third member 9c has the flexible portion 9c1 that bends toward the substrate 6. That is, the flexible portion 9c1 functions as a so-called play. Because the flexible portion 9c1 is provided in the third member 9c, it is possible to reduce a possibility that vibration of the touch panel 3 is inhibited by the first base 91. When the flatness (JIS B0621) of a surface of a part of the first base 91 included in the third member 9c is larger compared to the flatness of a surface of parts of the first base 91 included in the first member 9a and the second member 9b, it can be regarded that the third member 9c has the flexible portion 9c1.

Figure 10:
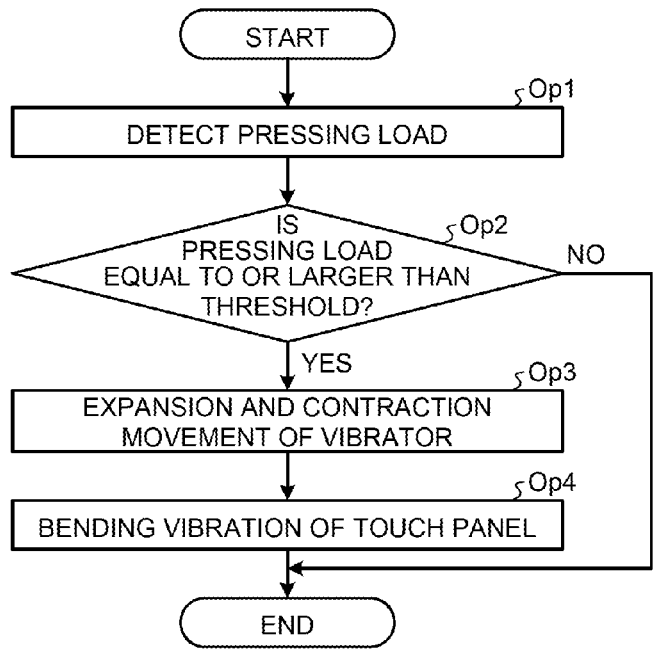
FIG. 10 is a flowchart indicating an example of operation of the above vibration device.

Next, an operation example of the vibration device X1 is explained referring to FIG. 10.

Although an operation example of the vibration X1 when the pressing feeling is transmitted to a user, among cases of tactile transmission, is explained, it is needless to say that the vibration device X1 is applicable to also a case when various kinds of tactile senses other than the pressing feeling, such as tracing feeling and texture feeling, are transmitted, for example.

As indicated in FIG. 10, when a user presses the top surface 3a of the touch panel 3 through the protecting member 4, the vibrator 5 detects a pressing load to the touch panel 3 (Op1). A load detecting function of the vibrator 5 is explained herein. Specifically, when a user presses the top surface 3a of the touch panel 3 via the protecting member 4, the touch panel 3 bends downward. When the touch panel 3 bends downward, the vibrator 5 is also bends downward. That is, a bent amount of the vibrator 5 varies according to the pressing load to the touch panel 3. As a result, the pressing load to the touch panel 3 can be detected by the vibrator 5.

A tactile transmission driver not shown determines whether the pressing load detected in Op 1 is equal to or larger than a threshold or not when an input operation by the user is a pressing operation to an input object displayed on a display screen (Op2).

When it is determined that the pressing load detected in Op1 is equal to or larger than the threshold (YES at Op2), the tactile transmission driver causes the vibrator 5 to make the expansion and contraction movement in the direction of short side of the touch panel 3 (Op3). By the vibrator 5 caused to make the expansion and contraction movement at Op3, the touch panel 3 makes bending vibration in the vertical direction (Op4). At this time, the first connecting member 9 follows the bending vibration of the touch panel 3. Thus, a pressing feeling is transmitted to the user that has pressed the top surface 3a of the touch panel 3 through the protecting member 4. On the other hand, when determining that the pressing load detected in Op1 is smaller than the threshold (NO at Op2), the tactile transmission driver ends the processing in FIG. 10.

As described, the vibration device X1 can reduce the possibility that vibration of the touch panel 3 is inhibited, while securing certain dustproofness and waterproofness.

Next, a mobile terminal P1 in which the vibration device X1 described above is equipped is explained referring to FIG. 11.

Figure 11:
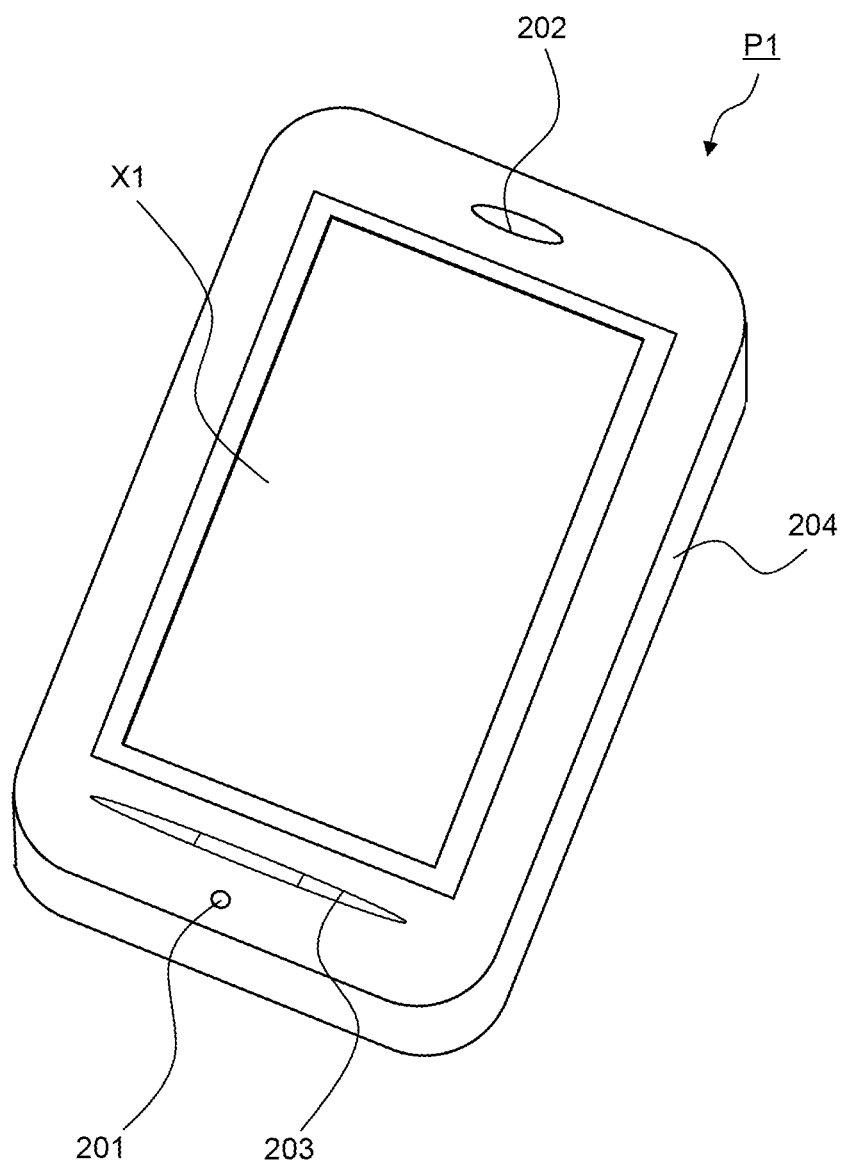
FIG. 11 is a perspective view indicating a schematic configuration of a mobile terminal according to the present embodiment.

FIG. 11 is a perspective view indicating a schematic configuration of the mobile terminal P1 according to the present embodiment. As indicated in FIG. 11, the mobile terminal P1 is, for example, an electronic device such as a mobile phone, a smartphone, and a PDA (personal digital assistant), and includes the vibration device X1, a sound input unit 201, a sound output unit 202, a key input unit 203, and a casing 204.

The sound input unit 201 is configured with, for example, a microphone or the like, and voice of a user and the like are input. The sound output unit 202 is configured with a speaker or the like, and voice and the like of a party on the other hand is output. The key input unit 203 is configured with, for example, mechanical keys. The key input unit 203 may be operation keys that are displayed on a display screen. The casing 204 has a role of housing the vibration device X1, the sound input unit 201, the sound output unit 202, and the key input unit 203.

In addition, the mobile terminal P1 can include a digital-camera function unit, a tuner for one segment broadcasting, a short-distance wireless communication unit such as an infrared-ray communication function unit, various kinds of interfaces, and the like, according to a required function; however, illustration and explanation of details thereof are omitted.

Because the mobile terminal P1 is equipped with the vibration device X1, it is possible to reduce the possibility that vibration of the touch panel 3 is inhibited, while securing certain dustproofness and waterproofness.

Although an example in which the mobile terminal P1 include the sound input unit 201 has been explained above, it is not limited thereto. That is, the sound input unit 201 is not required to be included in the mobile terminal P1.

Moreover, the vibration device X1 may be equipped in various kinds of electronic devices such as a programmable display for industrial use, a display mounted on vehicles, an electronic organizer, a personal computer, a copier, a terminal device for games, a television, and a digital camera, instead of the above mobile terminal P1.

Note that the embodiment described above indicates one specific example of the present invention, and various modifications thereof are possible. Some principal modifications are indicated below.

[Modification 1]

Figure 12:
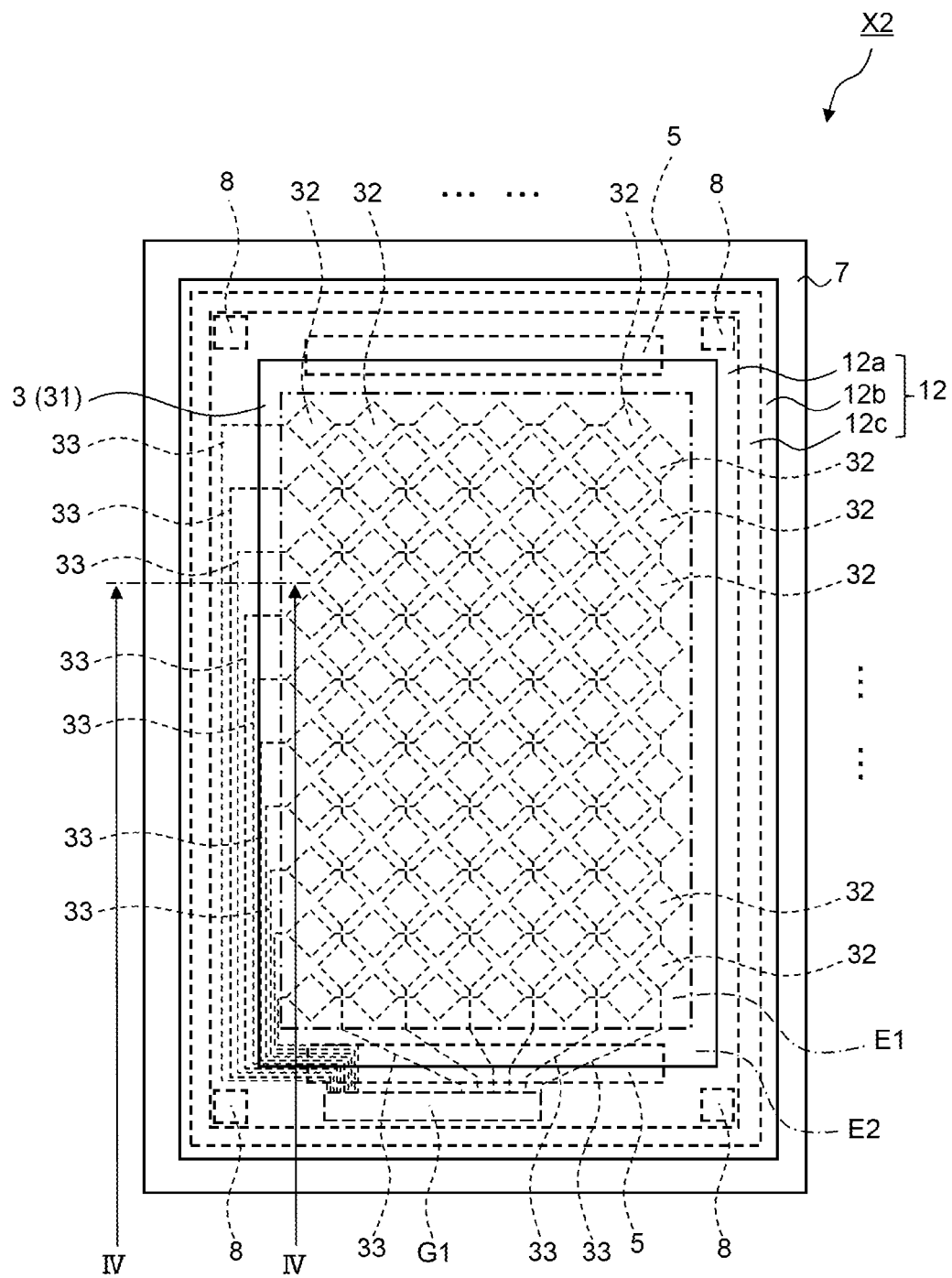
FIG. 12 is a plan view indicating a schematic configuration of a vibration device according to a modification 1.

FIG. 12 is a plan view indicating a schematic configuration of a vibration device X2 according to a modification 1. In FIG. 12, like reference symbols are given to components having like functions as those in FIG. 1, and detailed explanation thereof is omitted.

As indicated in FIG. 12, the vibration device X2 includes the touch panel 3 similarly to the vibration device X1. The touch panel 3 has an input region E1 and an outer region E2. The input region E1 is a region in which a user can make an input operation. The outer region E2 is a region that is positioned outside of the input region E1, and is a region in which a user cannot make an input operation. The outer region E2 according to the modification 1 is arranged so as to surround the input region E1.

The touch panel 3 includes a substrate 31, detection electrodes 32, and detection wirings 33. The top surface 3a of the touch panel 3 explained in the above embodiment signifies the top surface 3a of the substrate 31 in the modification 1. The bottom surface 3b and the end surfaces 3c of the touch panel 3 also signify the bottom surface 3b and the end surfaces 3c of the substrate 31, respectively, in the modification 1.

The substrate 31 has a role of supporting the detection electrodes 32 and the detection wirings 33. The substrate 31 is configured so as to have insulation properties, and also to have translucency to light entering in a direction perpendicular to the top surface 3a and the bottom surface 3b of the substrate 31. Therefore, as a constituent material of the substrate 31, for example, glass or plastic can be considered.

The detection electrode 32 generates an electrostatic capacity between itself and a finger of a user approaching the top surface 3a of the substrate 31 corresponding to the input region E1, and has a role of detecting an input position in an X direction and a Y direction. Multiple units of the detection electrodes 32 are arranged on the bottom surface 3b of the substrate 31 corresponding to the input region E1, aligned in the X direction and the Y direction. The detection electrode 32 according to the modification 1 is in a substantially rhombic shape in a planar view in terms of improving the detection sensitivity; however, it is not limited thereto.

As a constituent material of the detection electrode 32, a conductive material having translucency can be considered. As a conductive material having translucency, for example, ITO (indium tin oxide), IZO (indium zinc oxide), ATO (Al-doped zinc oxide), tin oxide, zinc oxide, or a conductive polymer can be considered.

The detection wiring 33 has a role of detecting a change in an electrostatic capacity generated between the detection electrode 32 and a finger of a user. Multiple units of the detection wirings 33 are arranged on the bottom surface 3b of the substrate 31 corresponding to the outer region E2. Furthermore, one end of the detection wiring 33 is electrically connected to the detection electrode 32, and the other end thereof is positioned in an outer conductive region G1. To the outer conductive region G1, a flexible board not shown is connected. The detection wiring 33 is electrically connected to a touch panel driver not shown through this flexible board.

The detection wiring 33 is structured with a metal thin film to obtain rigidity and high shape stability. As a metal thin film, for example, an aluminum film, an aluminum alloy film, a layered film with a chromium film and an aluminum film, a layered film with a chromium film and an aluminum alloy film, a silver film, a silver alloy film, or a gold alloy film can be considered.

Although a light shielding layer to decorate the outer region E2, and a protection layer to protect the detection electrodes 32 and the detection wirings 33, and the like are arranged in the touch panel 3 in an actual state, illustration and explanation of details thereof are omitted.

The vibration device X2 has a first connecting member 12 in place of the first connecting member 9 explained in the above embodiment. The first connecting member 12 has a role of connecting the top surface 3a of the substrate 31 and the top surface 7a of the frame 7.

Figure 13:
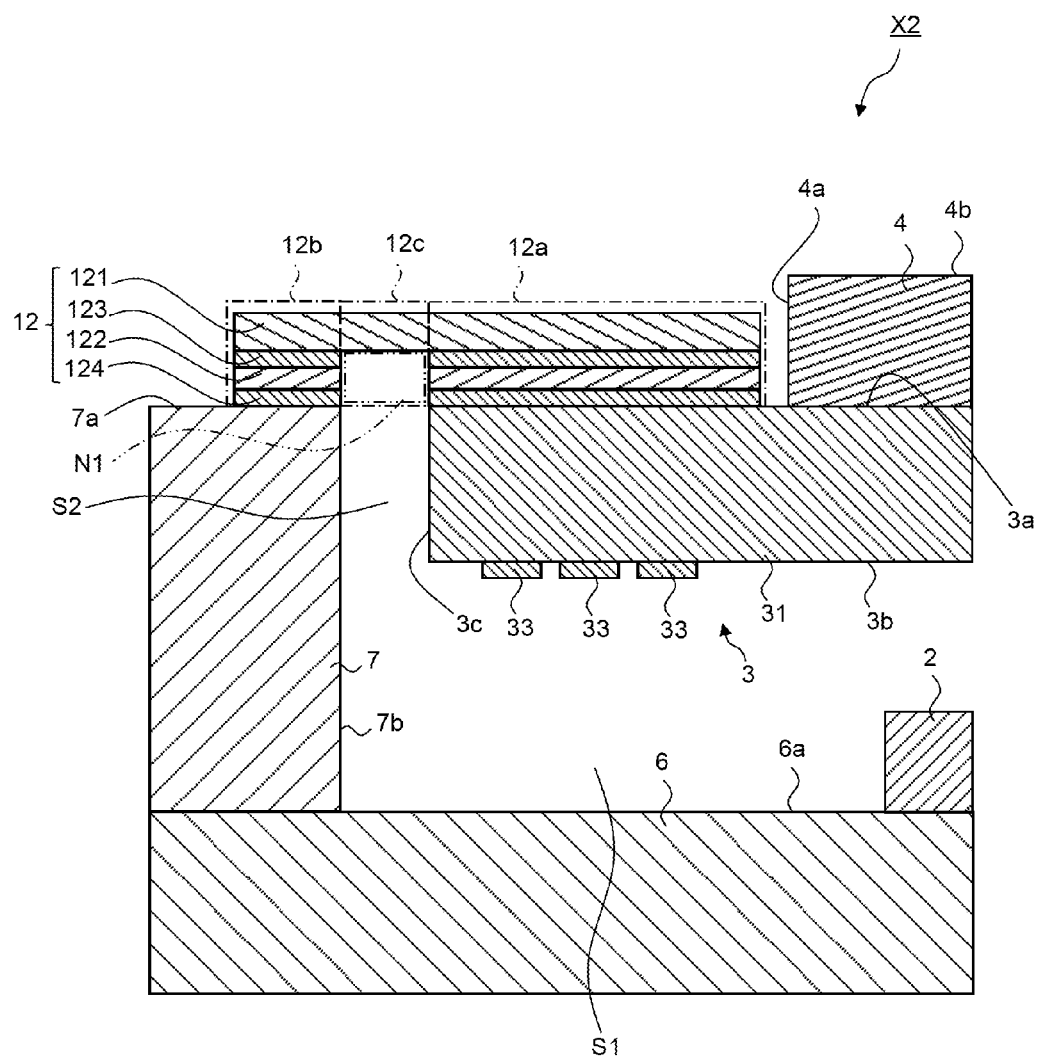
FIG. 13 is a cross section taken along a section line IV-IV indicated in FIG. 12.

FIG. 13 is a cross section taken along a section line IV-IV indicated in FIG. 12. As indicated in FIG. 12 and FIG. 13, the first connecting member 12 is arranged on the top surface 3a of the substrate 31 and the top surface 7a of the frame 7 so as to cover the second space S2 in a planar view. A portion positioned on the top surface 3a of the substrate 31 in the first connecting member 12 is a first member 12a. Moreover, a portion positioned on the top surface 7a of the frame 7 is a second member 12b. Furthermore, a portion that overlaps with the second space S2 in a planar view is a third member 12c.

In the modification 1, the third member 12c of the first connecting member 12 is arranged so as to cover the second space S2. Because the third member 12c is arranged so as to cover the second space S2, it is possible to reduce the possibility that dust or water enters into the first space S1. Therefore, the vibration device X2 has certain dustproofness and waterproofness.

The first connecting member 12 includes a first base 121, an intermediate base member 122, a first adhesive 123, and a second adhesive 124.

The first base 121 has a role of supporting the intermediate base member 122, the first adhesive 123, and the second adhesive 124. In the modification 1, the first base 121 has elasticity, and a light shielding property. Note that the "light shielding property" in the present application signifies a property of shielding visible light partially or entirely by reflection or absorption of the light. The first base 121 has, for example, a structure in which a light shielding layer is arranged in an elastic material of a rubber family or a foam resin family. As a constituent material of the light shielding layer, for example, carbon, titanium, or chromium can be considered. The light shielding layer is not limited to be in black, and may be formed in a color other than black.

Because the intermediate base member 122, the first adhesive 123, and the second adhesive 124 have functions similar to those of the intermediate base member 92, the first adhesive 93, and the second adhesive 94 explained in the above embodiment, detailed explanation thereof is omitted. The intermediate base member 122 may have a light shielding property also.

Because the first connecting member 12 includes the absent region N1 on the first base 121 similarly to the first connecting member 9, it is possible to reduce the possibility that vibration of the touch panel 3 is inhibited.

The first member 12a of the first connecting member 12 is arranged so as to overlap with at least a part of the detection wiring 33 in a planar view. Therefore, the first member 12a enables to reduce a possibility that at least a part of the detection wiring 33 is seen.

As described above, the vibration device X2 produces effects similar to those of the vibration device X1, and also produces a following effect in addition thereto. That is, in the vibration device X2, the first connecting member 12 enables to reduce a possibility that at least a part of the detection wiring 33 is seen.

[Modification 2]

Figure 14:
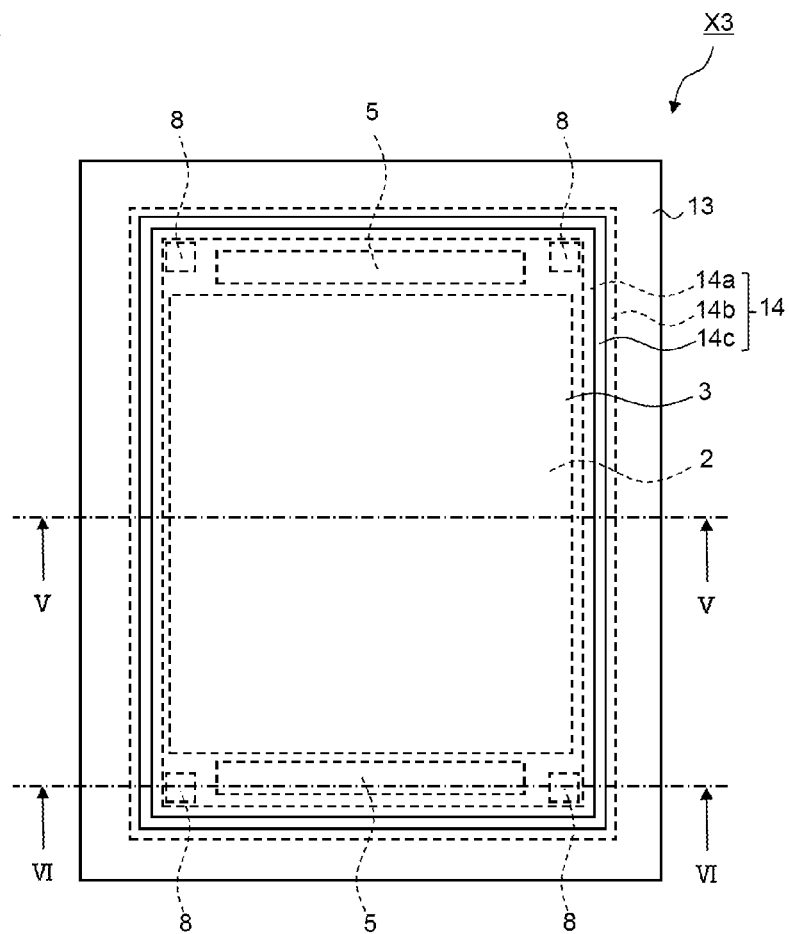
FIG. 14 is a plan view indicating a schematic configuration of a vibration device according to a modification 2.
Figure 15:
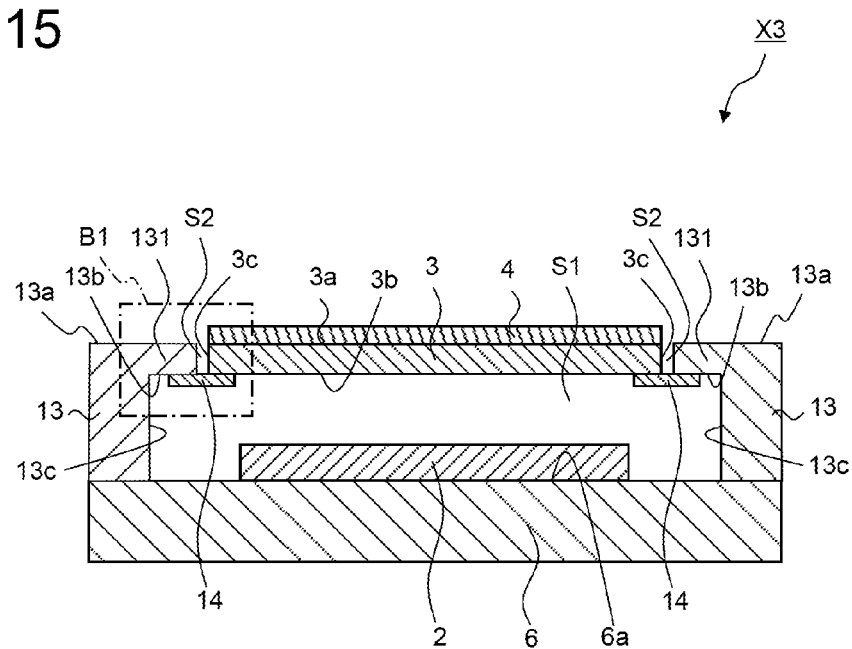
FIG. 15 is a cross section taken along a section line V-V indicated in FIG. 14.
Figure 16:
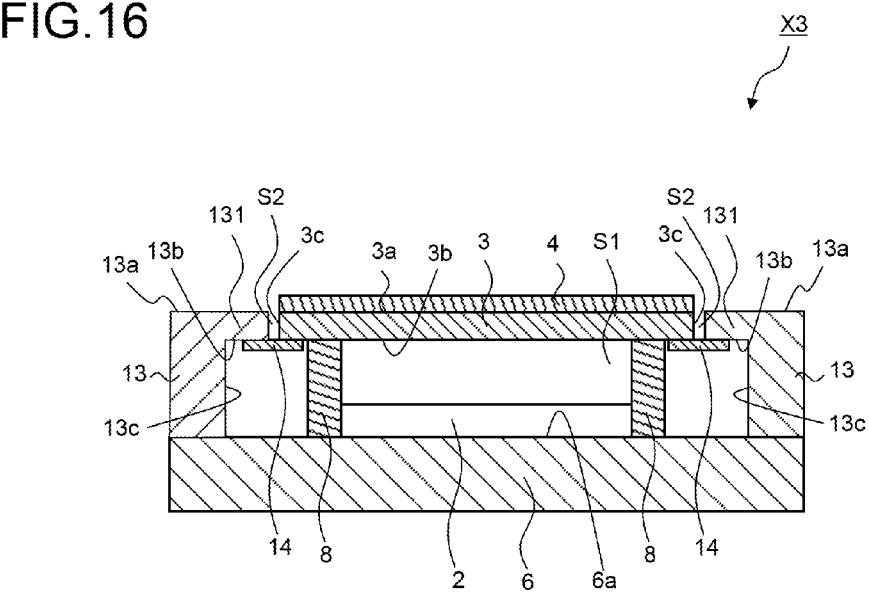
FIG. 16 is a cross section taken along a section line VI-VI indicated in FIG. 14.

FIG. 14 is a plan view indicating a schematic configuration of a vibration device X3 according to a modification 2. FIG. 15 is a cross section taken along a section line V-V indicated in FIG. 14. FIG. 16 is a cross section taken along a section line VI-VI indicated in FIG. 14. In FIG. 14 to FIG. 16, like reference symbols are given to like components having functions similar to those in FIG. 1 to FIG. 3, and detailed explanation thereof is omitted.

As indicated in FIG. 14 to FIG. 16, the vibration device X3 includes a frame 13 and a first connecting member 14 in place of the frame 7 and the first connecting member 9 explained in the above embodiment.

The frame 13 is separated from the end surfaces 3c of the touch panel 3, and is arranged on the main surface 6a of the substrate 6 so as to surround the liquid crystal panel 2 and the touch panel 3. Unlike the frame 7, the frame 13 has a convex portion 131 that protrudes toward the end surface 3c of the touch panel 3. The frame 13 includes a top surface 13a, a bottom surface 13b, and a side surface 13c. The bottom surface 13b signifies a bottom surface of the convex portion 131.

The first connecting member 14 has a role of connecting the bottom surface 3b of the touch panel 3 and the bottom surface 13b of the frame 13. The first connecting member 14 is arranged on the bottom surface 3b of the touch panel 3 and the bottom surface 13b of the frame 13 so as to cover the second space S2 in a planar view. A portion positioned on the bottom surface 3b of the touch panel 3 in the first connecting member 14 is a first member 14a. Moreover, a portion positioned on the bottom surface 13b of the frame 13 is a second member 14b. Furthermore, a portion that covers the second space S2 in a planar view is a third member 14c.

In the modification 2, the first connecting member 14 is arranged so as to cover a space in the first space S1 except the second space S2. Because the first connecting member 14 is arranged so as to cover a space in the first space S1 except the second space S2, it is possible to reduce a possibility that dust or water enters into a space in the first space S1 except the second space S2. Therefore, the vibration device X3 has certain dustproofness and waterproofness.

Figure 17:
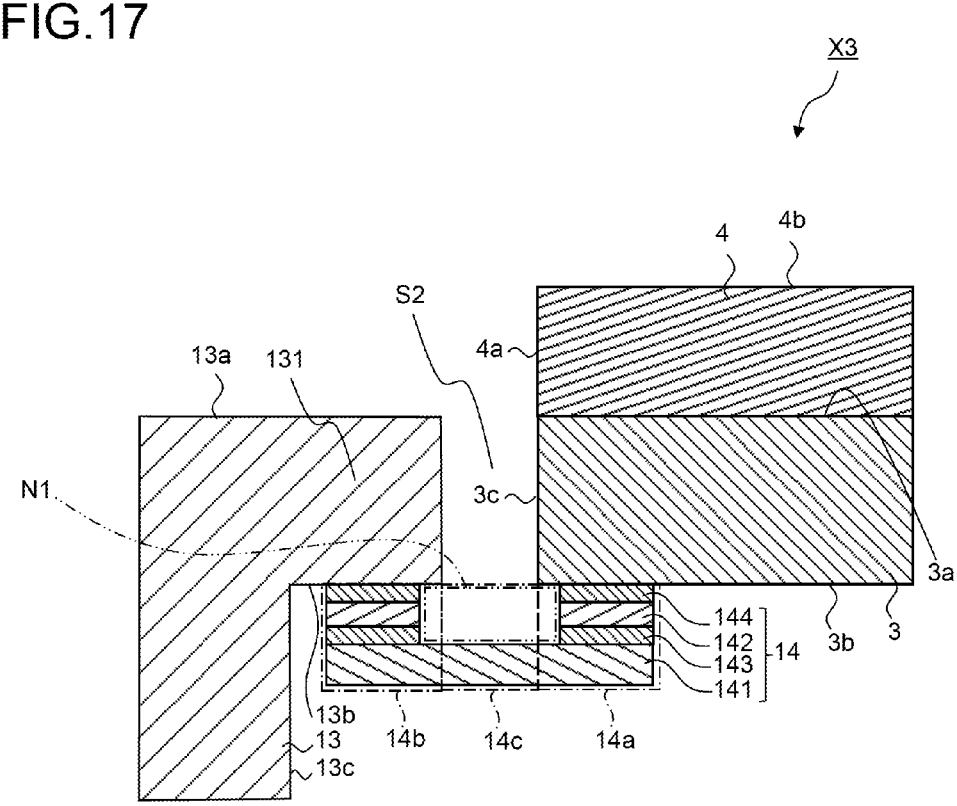
FIG. 17 is an enlarged view of a portion B1 indicated in FIG. 15.

FIG. 17 is an enlarged view of a portion B1 indicated in FIG. 15. As indicated in FIG. 17, the first connecting member 14 includes a first base 141, an intermediate base member 142, a first adhesive 143, and a second adhesive 144.

The first base 141, the intermediate base member 142, the first adhesive 143, and the second adhesive 144 have functions similar to those of the first base 91, the intermediate base member 92, the first adhesive 93, and the second adhesive 94, respectively. That is, the first adhesive 143 has a role of connecting the first base 141 and the intermediate base member 142. The second adhesive 144 has a role of connecting the intermediate base member 142 and the bottom surface 3b of the touch panel 3, and a role of connecting the intermediate base member 142 and the bottom surface 13b of the frame 13.

Because the first connecting member 14 includes the absent region N1 on the first base 141 similarly to the first connecting member 9, it is possible to reduce the possibility that vibration of the touch panel 3 is inhibited.

Moreover, the first connecting member 14 is arranged on the bottom surface 3b of the touch panel 3 and the bottom surface 13b of the frame 13. Therefore, it is possible to reduce a possibility that a user accidentally touches the first connecting member 14, compared to a case in which the first connecting member 14 is arranged on the top surface 3a of the touch panel 3 and the top surface 13a of the frame 13. Therefore, it is possible to reduce a possibility that the first connecting member 14 comes off from the bottom surface 3b of the touch panel 3 and the bottom surface 13b of the frame 13.

As described above, the vibration device X3 produces effects similar to those of the vibration device X1, and also produces a following effect in addition thereto. That is, the vibration device X3 can reduce a possibility that the first connecting member 14 comes off from the bottom surface 3b of the touch panel 3 and the bottom surface 13b of the frame 13.

In the modification 2, the supporting member 8 is not overlapped with the first member 14a in a planar view. Specifically, the supporting member 8 is arranged in a region in which the first member 14a is not arranged, on the bottom surface 3b of the touch panel 3. That is, in the modification 2, the supporting member 8 directly supports the bottom surface 3b of the touch panel 3 not through the first member 14a. Therefore, it is possible to support the bottom surface 3b of the touch panel 3 surely with the supporting member 8. Accordingly, in the vibration device X3, it is possible to cause the touch panel 3 to make bending vibration sufficiently in the vertical direction.

If the first connecting member 14 is present at a portion at which the supporting member 8 is to be arranged, a cut out portion may be arranged in a part of the first connecting member 14, and the supporting member 8 may be arranged on the bottom surface 3b of the touch panel 3 exposed at the cut out portion.

Furthermore, an example in which the first connecting member 14 connects the bottom surface 3b of the touch panel 3 and the bottom surface 13b of the frame 13 has been explained in the modification 2, it is not limited thereto. For example, the first connecting member 14 may connect the bottom surface 3b of the touch panel 3 and the side surface 13c of the frame 13. In this case, the first connecting member 14 is arranged on the bottom surface 3b of the touch panel 3 and the side surface 13c of the frame 13.

[Modification 3]

Although an example of the mobile terminal P1 in which the vibration device X1 is equipped has been explained above, either the vibration device X2 or X3 may be adopted in place of the vibration device X1. Moreover, the respective components in the embodiment described above may be configured in combination, and the embodiment described above and the modifications described above may also be combined with each other.

[Modification 4]

Although an example in which the vibration devices X1 to X3 are applied to the tactile transmission technology has been explained above, it is not limited thereto. The present invention is also applicable to, for example, a speaker technology of outputting sound by vibrating an operation panel, or to a bone conduction technology enabling to hear sound by vibrating an operation panel, other than the tactile transmission technology. It is, of course, also applicable to a cartilage conduction technology in the bone conduction technology. The cartilage conduction is a technology in which a sound signal is converted into vibration, transmitted to a cartilage of an external ear to stimulate the inner ear through bones thereinside, to transmit to the auditory nerve.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A vibration device comprising:
   an operation panel;
   a vibrator that is arranged on the operation panel;
   a frame that is separated from at least a part of the operation panel in a planar view, the frame being arranged to surround the operation panel; and
   a first connecting member that is arranged on the operation panel and the frame to cover a space between the part of the operation panel and the frame in a planar view, the first connecting member connecting the operation panel and the frame, the first connecting member includes a base and an adhesive member arranged on the base, wherein
   the first connecting member includes a first member positioned on the operation panel, a second member positioned on the frame, and a third member covering the space in a planar view,
   a thickness of the third member is smaller than those of the first and second members, the adhesive member of the first member connects the base of the first member and the operation panel, the adhesive member of the second member connects the base of the second member and the frame, an absent region where the adhesive member is not arranged is included over the base of the third member, and the absent region is positioned over a part of the first member, the third member, and a part of the second member.

2. The vibration device according to claim 1, wherein the adhesive member includes first and second adhesives, the first connecting member further includes an intermediate base member that is positioned between the first and second adhesives and is connected to the base with the first adhesive therebetween, the second adhesive of the first member connects the intermediate base member of the first member and the operation panel, the second adhesive of the second member connects the intermediate base member of the second member and the frame, and the absent region includes a region in which the first adhesive, the intermediate base member, and the second adhesive are not arranged.

3. The vibration device according to claim 1, wherein the operation panel includes a top surface and a bottom surface positioned on an opposite side to the top surface, and the vibrator is arranged on the bottom surface of the operation panel, and the vibration device further comprises a supporting member that supports the bottom surface of the operation panel.

4. The vibration device according to claim 3, wherein the first member is positioned on the top surface of the operation panel.

5. The vibration device according to claim 4, wherein the third member is positioned to surround the operation panel in a planar view, the supporting member includes a plurality of supporting members, and the supporting members are separated from each other in a planar view.

6. The vibration device according to claim 4, further comprising a protecting member that is arranged on the top surface of the operation panel, the protecting member being adjacent to the first member, wherein a thickness of the first member is substantially equal to or smaller than that of the protecting member.

7. The vibration device according to claim 6, wherein the first member is in contact with an end surface of the protecting member.

8. The vibration device according to claim 1, further comprising a second connecting member that is arranged on at least one of the operation panel and the frame to cover at least a part of the first connecting member.

9. The vibration device according to claim 1, wherein the operation panel includes a touch panel, and the vibration device further comprises a display panel that is arranged opposite to the operation panel, the display panel being positioned to be surrounded by the frame.

10. The vibration device according to claim 1, wherein the operation panel includes a display panel that has a function of detecting an input position.

11. An electronic device that includes a vibration device, the vibration device comprising:

an operation panel;

a vibrator that is arranged on the operation panel;

a frame that is separated from at least a part of the operation panel in a planar view, the frame being arranged to surround the operation panel; and a first connecting member that is arranged on the operation panel and the frame to cover a space between the part of the operation panel and the frame in a planar view, the first connecting member connecting the operation panel and the frame, the first connecting member includes a base and an adhesive member arranged on the base, wherein the first connecting member includes a first member positioned on the operation panel, a second member positioned on the frame, and a third member covering the space in a planar view, a thickness of the third member is smaller than those of the first and second members, the adhesive member of the first member connects the base of the first member and the operation panel, the adhesive member of the second member connects the base of the second member and the frame, an absent region where the adhesive member is not arranged is included over the base of the third member, and the absent region is positioned over a part of the first member, the third member, and a part of the second member.

* * * * *